United States Patent
Liao

(10) Patent No.: US 9,633,635 B2
(45) Date of Patent: Apr. 25, 2017

(54) MUSICAL INSTRUMENT STAND CLAMP

(71) Applicant: Tsun-Chi Liao, Taichung (TW)

(72) Inventor: Tsun-Chi Liao, Taichung (TW)

(*) Notice: Subject to any disclaimer, the term of this patent is extended or adjusted under 35 U.S.C. 154(b) by 0 days.

(21) Appl. No.: 14/962,344

(22) Filed: Dec. 8, 2015

(65) Prior Publication Data

US 2017/0084257 A1 Mar. 23, 2017

(30) Foreign Application Priority Data

Sep. 21, 2015 (TW) .............................. 104215199 U

(51) Int. Cl.
*G10D 13/02* (2006.01)
*G10G 5/00* (2006.01)
*F16B 2/06* (2006.01)
*F16B 2/10* (2006.01)
*F16M 13/02* (2006.01)

(52) U.S. Cl.
CPC ........... *G10D 13/026* (2013.01); *F16B 2/065* (2013.01); *F16B 2/10* (2013.01); *F16M 13/022* (2013.01); *G10D 13/02* (2013.01); *G10G 5/00* (2013.01)

(58) Field of Classification Search
CPC ......... G10D 12/02; G10D 13/026; G10G 5/00
USPC .......................................................... 84/421
See application file for complete search history.

(56) References Cited

U.S. PATENT DOCUMENTS

| | | | | |
|---|---|---|---|---|
| 5,017,038 A * | 5/1991 | Kurosaki | ................. | E04G 7/16 24/335 |
| 6,093,878 A * | 7/2000 | Hoshino | ................. | G10D 13/06 248/122.1 |
| 6,096,956 A * | 8/2000 | Hoshino | ................. | G10D 13/00 84/421 |
| 6,344,605 B1 * | 2/2002 | Liao | ........................ | F16M 11/10 84/327 |
| 6,346,665 B1 * | 2/2002 | Liao | ........................ | F16M 11/14 84/327 |
| 6,484,977 B1 * | 11/2002 | Yu | ............................ | G10G 5/00 248/125.1 |
| 9,251,771 B1 * | 2/2016 | Hsu | .......................... | G10G 5/00 |
| 2008/0179266 A1 * | 7/2008 | Mori | ..................... | G10D 13/026 211/85.6 |
| 2011/0126693 A1 * | 6/2011 | Reyes | ................... | G10D 13/026 84/421 |
| 2012/0118126 A1 * | 5/2012 | Sato | ....................... | G10D 13/026 84/421 |

(Continued)

*Primary Examiner* — David Warren
*Assistant Examiner* — Christina Schreiber
(74) *Attorney, Agent, or Firm* — Muncy, Geissler, Olds & Lowe, P.C.

(57) ABSTRACT

A musical instrument stand clamp, which to be fixed to a stand, comprises a fixed part, a movable part, and a screwing-lock part. The movable part is pivotally coupled to a pivotal point of the fixed part. The fixed part includes a locked section and a clamping section respectively at two sides of the pivotal point. The movable part includes an outer curved surface near the locked section and a movable member far away from the locked section. The screwing-lock part is screwed through the locked section to push the outer curved surface of the movable part and rotate the movable part with respect to the fixed part so as to move the movable member toward a clamping member of the locked section, whereby the clamp is fixed to the stand. Thus, the clamp can be fast assembled or disassembled merely via rotating the screwing-lock part.

8 Claims, 6 Drawing Sheets

(56) References Cited

U.S. PATENT DOCUMENTS

2014/0026737 A1\* 1/2014 Sato ............... G10D 13/026
  84/421
2014/0116230 A1\* 5/2014 Nakata ............ G10D 13/026
  84/453

\* cited by examiner

MUSICAL INSTRUMENT STAND CLAMP

FIELD OF THE INVENTION

The present invention relates to a musical instrument stand clamp, particularly to a fast-assemble/disassemble structure of a musical instrument stand clamp.

BACKGROUND OF THE INVENTION

Refer to FIG. 1. A musical instrument, such as a pair of cymbals 1 or a drum 2, is usually fixed to a stand 4 with a clamp 3, whereby they can be arranged around the performer.

The clamp 3 comprises a static plate 5 and a movable plate 6. The static plate 5 and the movable plate 6 respectively include clamp grooves 7. The clamp grooves 7 are corresponding to each other and respectively disposed at two sides of the stand 4. The stand 4 is clamped by the two clamp grooves 7, and two screws 8 are screwed into the static plate 5 and the movable plate 6 respectively from two sides of the stand 4 to lock the static plate 5 and the movable plate 6 together, whereby the clamp 3 is secured to the stand 4.

As shown in FIG. 1, two screws 8 must be screwed into the static plate 5 and the movable plate 6 tightly to mount the clamp 4 on the stand 3, which is obviously time-consuming. Besides, the user may fail to lock the screws 8 tightly in haste. The screws 8 must be unscrewed from the static plate 5 and the movable plate 6 to disassemble the clamp 3 from the stand 4, which is also time-consuming. Once one of the screws 8 is unscrewed, the clamp 3 has a risk of slipping off the stand 4. Therefore, the musical instrument may be damaged while the user disassembles the clamp 3.

Therefore, the user has to spend more time in assembling the conventional clamp 3 to and disassembling the conventional clamp 3 from a musical instrument stand. Further, the user has to pay more attention to using the conventional clamp 3 lest the musical instrument be damaged or the performance be affected. Obviously, the conventional clamp 3 for a musical instrument stand is hard to satisfy the requirement of users.

SUMMARY OF THE INVENTION

The primary objective of the present invention is to provide a musical instrument stand clamp, whereby the user can assemble or disassemble the musical instrument stand clamp merely via locking or unlocking a single a screw.

To achieve the abovementioned objective, the present invention proposes a musical instrument stand clamp, which is to be fixed to a stand and comprises a fixed part, a movable part and a screwing-lock part. The movable part is pivotally coupled to a pivotal point. The fixed part includes a locked section and a clamping section respectively at two sides of the pivotal point. The clamping section includes a clamping member. The movable part includes an outer curved surface near the locked section and a movable member far away from the locked section. The screwing-lock part is screwed through the locked section to push the outer curved surface of the movable part to rotate the movable part with respect to the fixed part and move the movable member toward the clamping member, whereby the stand is clamped by the fixed part and the movable part, wherefore the clamp of the present invention is fixed to the stand.

In the present invention, rotating the screwing-lock part can push the outer curved surface, rotate the movable part with respect to the fixed part, and make the movable member of the movable part and the clamping member approach to each other. Thereby, the musical instrument stand clamp of the present invention can be fast assembled or disassembled merely via rotating the screwing-lock part.

DETAILED DESCRIPTION OF THE PREFERRED EMBODIMENTS

Figure 1:
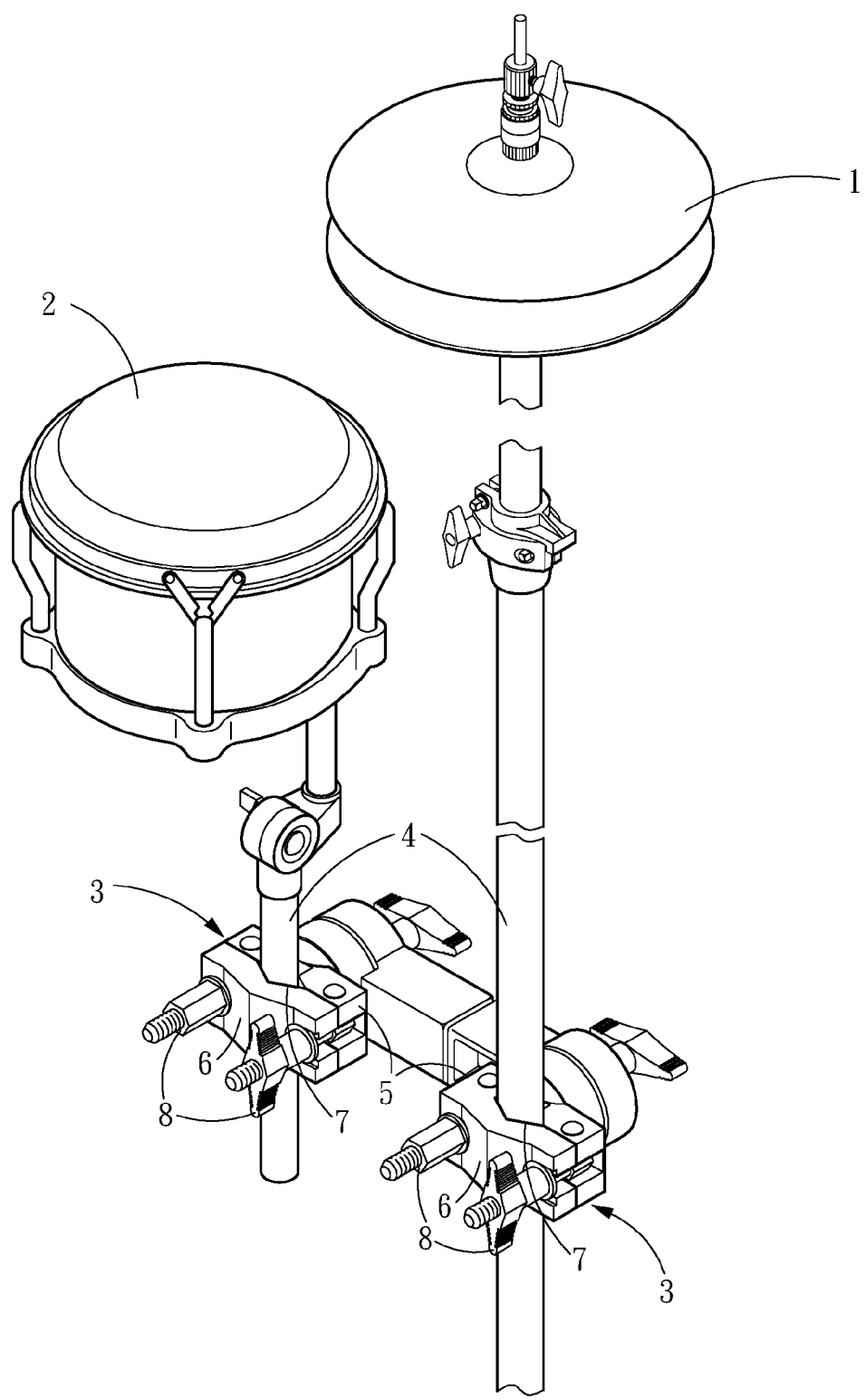
FIG. 1 is a diagram schematically showing the usage of a conventional musical instrument stand clamp.
Figure 2:
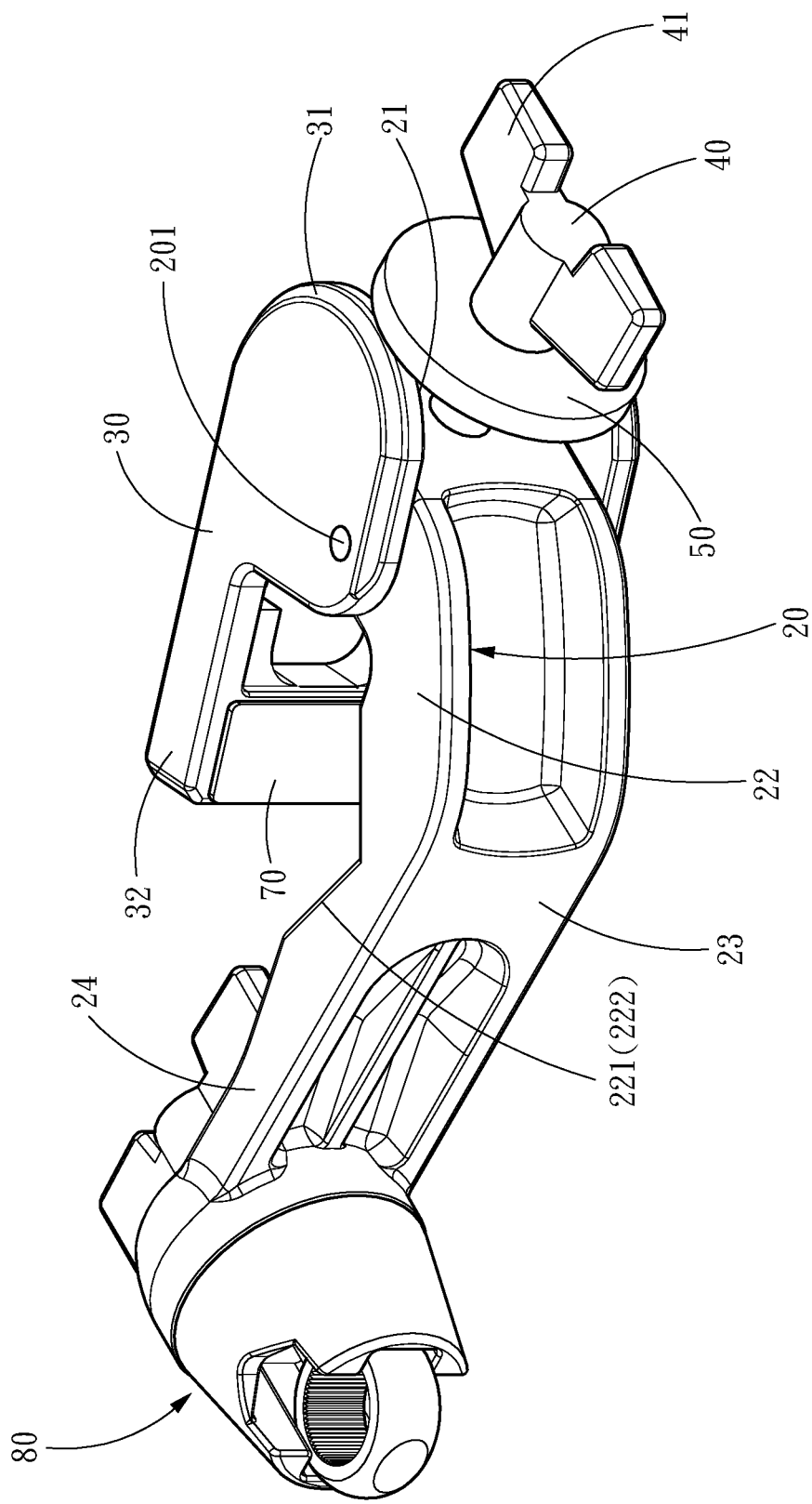
FIG. 2 is an assembly drawing schematically showing a musical instrument stand clamp according to one embodiment of the present invention.
Figure 3:
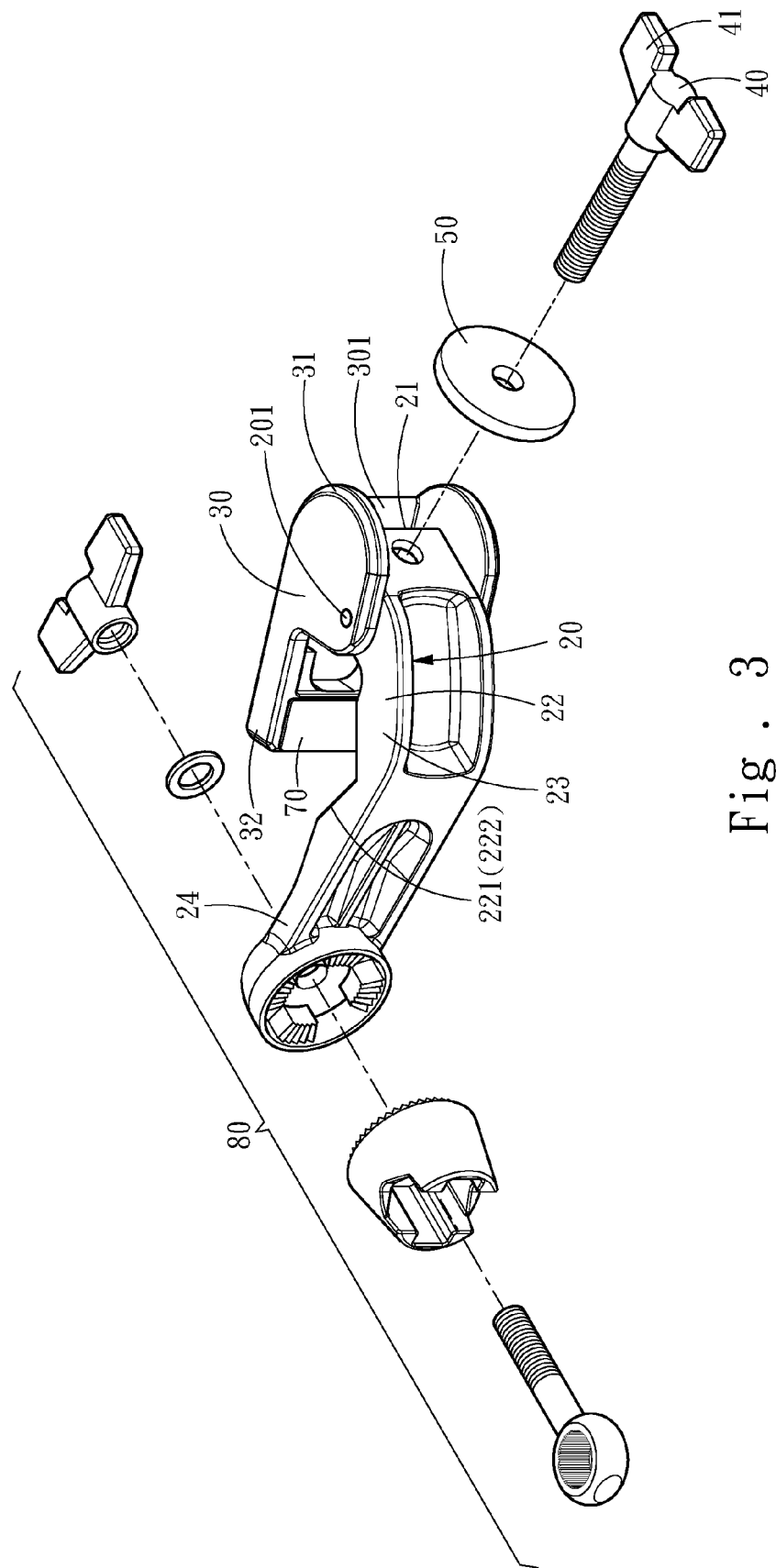
FIG. 3 is an exploded view schematically showing a musical instrument stand clamp according to one embodiment of the present invention.
Figure 4A:
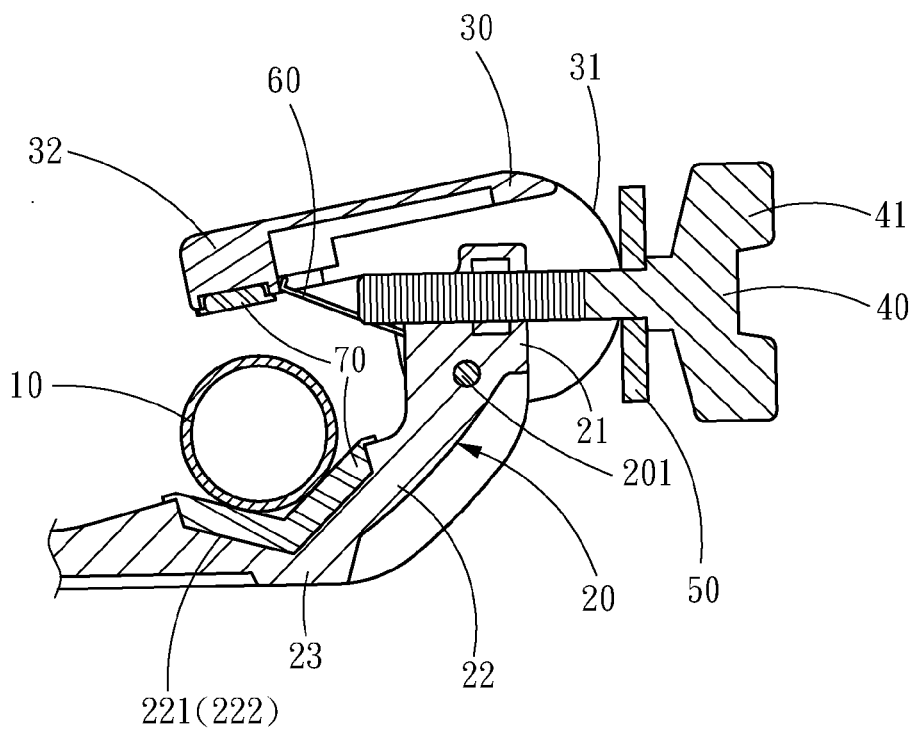
FIG. 4A is a sectional view schematically showing an opened musical instrument stand clamp according to one embodiment of the present invention.
Figure 4B:
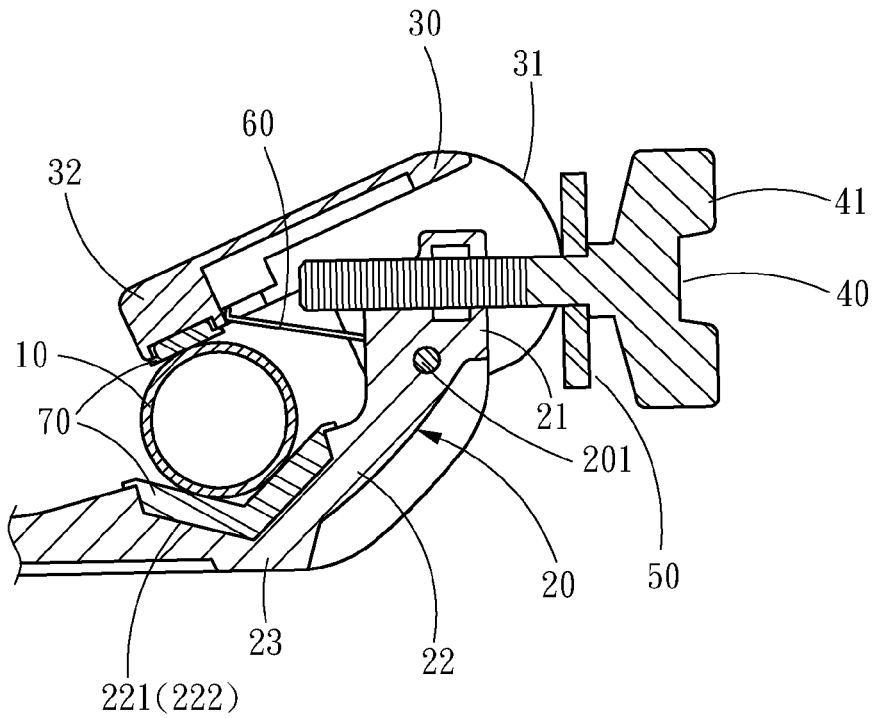
FIG. 4B is a sectional view schematically showing a closed musical instrument stand clamp according to one embodiment of the present invention.
Figure 5:
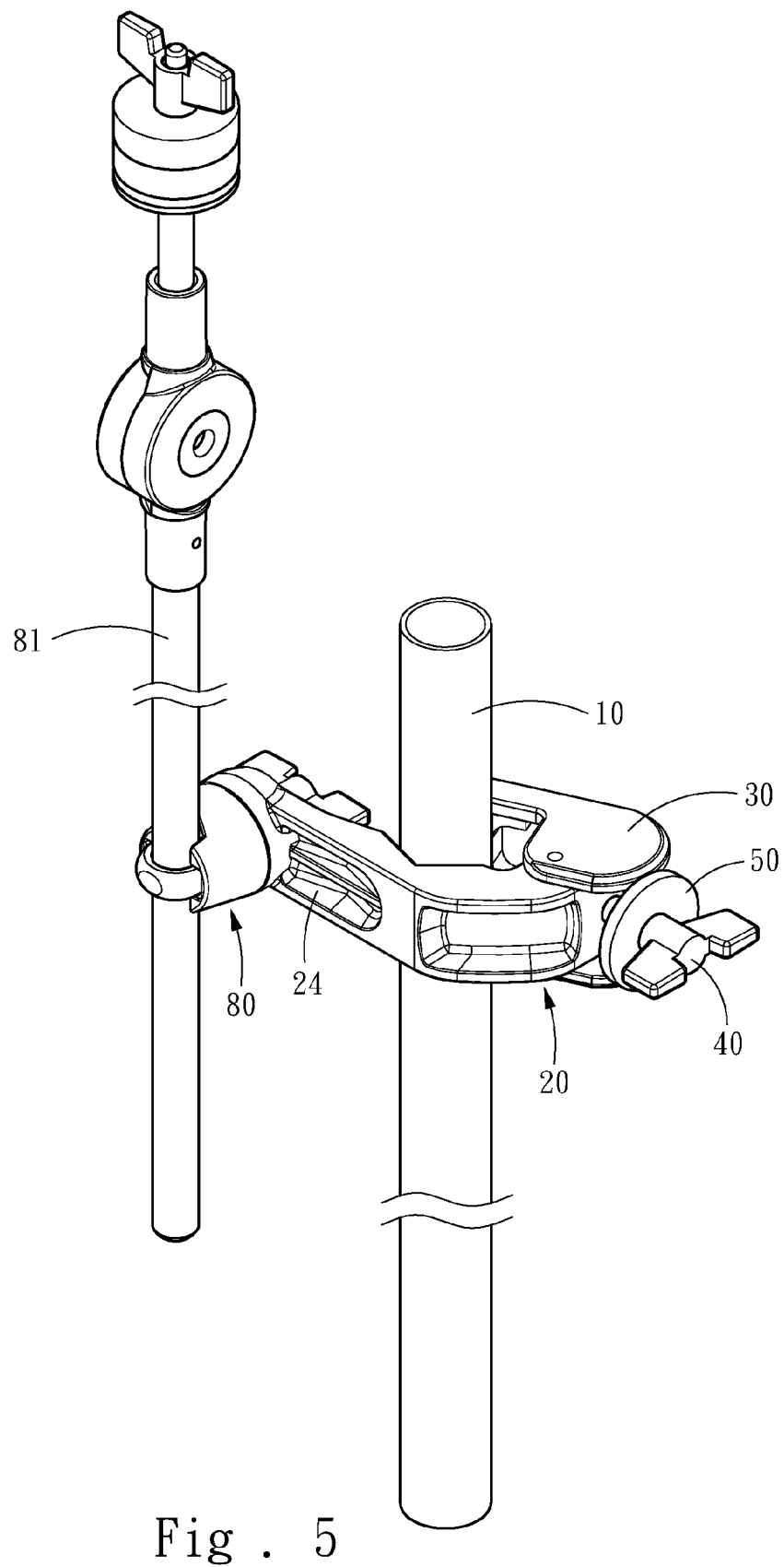
FIG. 5 is a diagram schematically showing an application of a musical instrument stand clamp according to one embodiment of the present invention.

The embodiments will be described in detail in cooperation with the attached drawings to demonstrate the technical contents, characteristics and efficacies of the present invention below.

Refer to FIG. 2, FIG. 3, FIG. 4A, FIG. 4B, and FIG. 5. The musical instrument stand clamp of the present invention is to be fixed to a stand 10 and comprises a fixed part 20, a movable part 30, and a screwing-lock part 40, wherein the movable part 30 is pivotally coupled to a pivotal point 201, and wherein the fixed part 20 includes a locked section 21 and a clamping section 22 respectively at two sides of the pivotal point 201.

The clamping section 22 includes a clamping member 221. The clamping member 221 includes a fixing groove 222. The movable part 30 includes an outer curved surface 31 near the locked section 21 and a movable member 32 far away from the locked section 21. The screwing-lock part 40 is screwed through the locked section 21 to push the outer curved surface 31 to rotate the movable part 30 with respect to the fixed part 20 and move the movable member 32 toward the clamping member 221, whereby the stand 10 is finally clamped by the fixed part 20 and the movable part 30.

In one embodiment, the movable part 30 includes an accommodation room 301 for accommodating the locked section 21 of the fixed part 20, whereby the fixed part 20 and the movable part 30 are pivotally coupled to assume a bilateral-symmetry and maintain the balance of the overall structure. In one embodiment, the screwing-lock part 40 includes a manual knob 41 for rotating the screwing-lock part 40. In one embodiment, a protrudent block 23 is vertically extended from the clamping section 22 for clamping a thinner stand 10. The clamping member 221 is disposed on the protrudent block 23 to make the movable member 32 able to approach the clamping member 221 more closely so as to clamp a thinner stand 10.

In one embodiment, a pressing plate 50 is arranged between the screwing-lock part 40 and the outer curved surface 31, and the screwing-lock part 40 squeezes the outer curved surface 31 through the pressing plate 50, whereby is improved the operation stability. In one embodiment, the musical instrument stand clamp of the present invention further comprises a position-restoring spring 60 whose two ends respectively press against the fixed part 20 and the movable part 30 to separate the movable member 32 from the clamping member 221, whereby is improved the operation convenience. While the screwing-lock part 40 is gradually screwed out, the resilient force of the position-restoring spring 60 makes the outer curved surface 31 keeps on contacting the screwing-lock part 40 and makes the clamping member 221 separated from the movable member 32.

In one embodiment, soft pads 70 are respectively disposed on the clamping member 221 and the movable member 32 to increase the clamping force therebetween and prevent the surface of the stand 10 from being damaged by clamping. In one embodiment, an installation plate 24 is extended outward from the clamping section 22, and the installation plate 24 is used to fix a cylindrical connector 80. The cylindrical connector 80 is used to lock a cymbal rack 81 for fixing a cymbal (not shown in the drawings).

Figure 6:
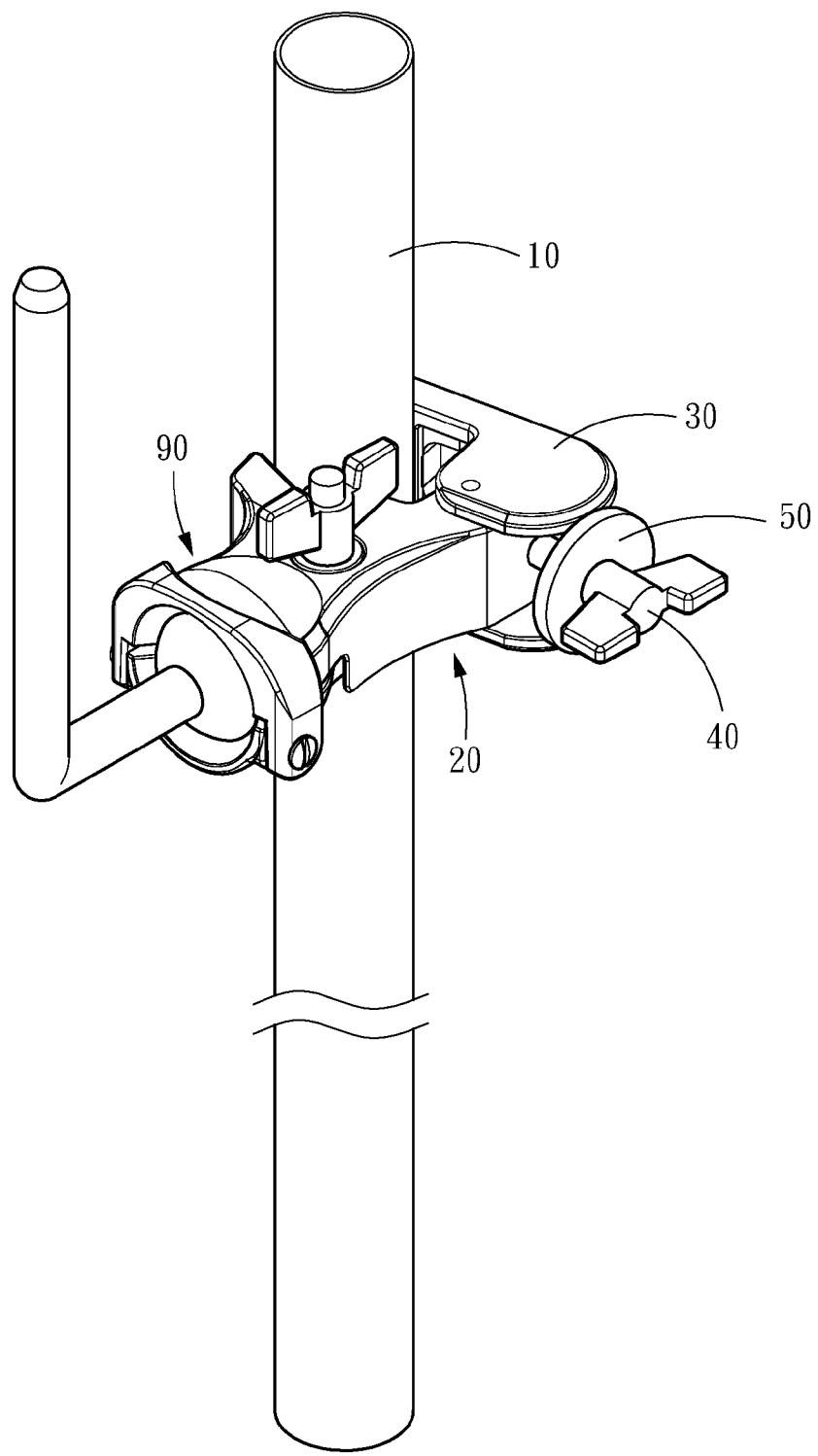
FIG. 6 is a diagram schematically showing another application of a musical instrument stand clamp according to one embodiment of the present invention.

Refer to FIG. 6. In one embodiment, a universal joint 90 is extended outward from the clamping section 22 for locking various musical instruments (not shown in the drawings), whereby the musical instrument can be rotated or disposed freely.

In summary, the present invention at least includes the following advantages:

1. Rotating the screwing-locking member squeezes the outer curved surface and rotates the movable part toward the fixed part, whereby the clamping member of the fixed part and the movable member of the movable part approach to each other and clamp the stand, wherefore the clamp of the present invention can be fast assembled or disassembled.

2. The position-restoring spring of the present invention can automatically separate the clamping member from the movable member and increase operation convenience.

3. The soft pads of the present invention can function as buffers to avoid damage to the stand and increase structural stability.

4. The protrudent block extends from the locked section and allows the clamping member to be disposed thereon, whereby the movable member can approach the clamping member more closely for clamping a thinner stand.

What is claimed is:

1. A musical instrument stand clamp, which to be fixed to a stand, comprising:
    a fixed part, including a pivotal point, a locked section and a clamping section respectively at two sides of the pivotal point, and a clamping member disposed at the clamping section;
    a movable part pivotally coupled to the pivotal point of the fixed part, and wherein the movable part includes an outer curved surface near the locked section and a movable member far away from the locked section; and
    a screwing-lock part, including a manual knob and a screw extended from the manual knob and running through the locked section;
    a pressing plate, disposed between the manual knob and the outer surface, two sides of the pressing plate abutting against the outer curved surface and the manual knob respectively, wherein the screw is screwed through the pressing plate and the locked section, and the manual knob pushes the pressing plate and the outer curved surface to rotate the movable part with respect to the fixed part so as to move the movable member toward the clamping member and make the fixed part and the movable part clamp the stand.

2. The musical instrument stand clamp according to claim 1 further comprising a position-restoring spring whose two ends respectively press against the fixed part and the movable part to separate the movable member from the clamping member.

3. The musical instrument stand clamp according to claim 1, wherein soft pads are respectively disposed on the clamping member and the movable member.

4. The musical instrument stand clamp according to claim 1, wherein an installation plate is extended outward from the clamping section, and the installation plate is used to fix a cylindrical connector.

5. The musical instrument stand clamp according to claim 1, wherein a universal joint is extended outward from the clamping section.

6. The musical instrument stand clamp according to claim 1, wherein the movable part includes an accommodation room for accommodating the locked section of the fixed part.

7. The musical instrument stand clamp according to claim 1, wherein the clamping member includes a fixing groove.

8. The musical instrument stand clamp according to claim 1, wherein a protrudent block is vertically extended from the clamping section, and the clamping member is disposed on the protrudent block.

\* \* \* \* \*